United States Patent [19]

Nicolini et al.

[11] 4,151,367
[45] Apr. 24, 1979

[54] DATA SYNC ACQUISITION IN AN ASYNCHRONOUS BINARY ADDRESS DECODER

[75] Inventors: John D. Nicolini, Margate; David F. Willard, Plantation, both of Fla.

[73] Assignee: Motorola, Inc., Schaumburg, Ill.

[21] Appl. No.: 792,161

[22] Filed: Apr. 29, 1977

[51] Int. Cl.² .............................................. H04L 7/00
[52] U.S. Cl. ................................ 178/69.1; 340/167 R
[58] Field of Search ............... 340/167 R, 146.2, 311, 340/168; 328/55, 155; 178/69.1, 53; 358/148; 179/15 BS

[56] References Cited

U.S. PATENT DOCUMENTS

| 4,010,323 | 3/1977 | Peck | 178/69.1 |
| 4,010,421 | 3/1977 | Lind | 178/69.1 |

Primary Examiner—Benedict V. Safourek
Attorney, Agent, or Firm—Margaret Marsh Parker; James W. Gillman

[57] ABSTRACT

Synchronization for data sampling pulses in a two-way alphanumeric data terminal is provided by utilization of signals present in the page address decoder circuitry. Microprocessor power-up timing is also obtained from the same signals.

7 Claims, 5 Drawing Figures

PRIOR ART

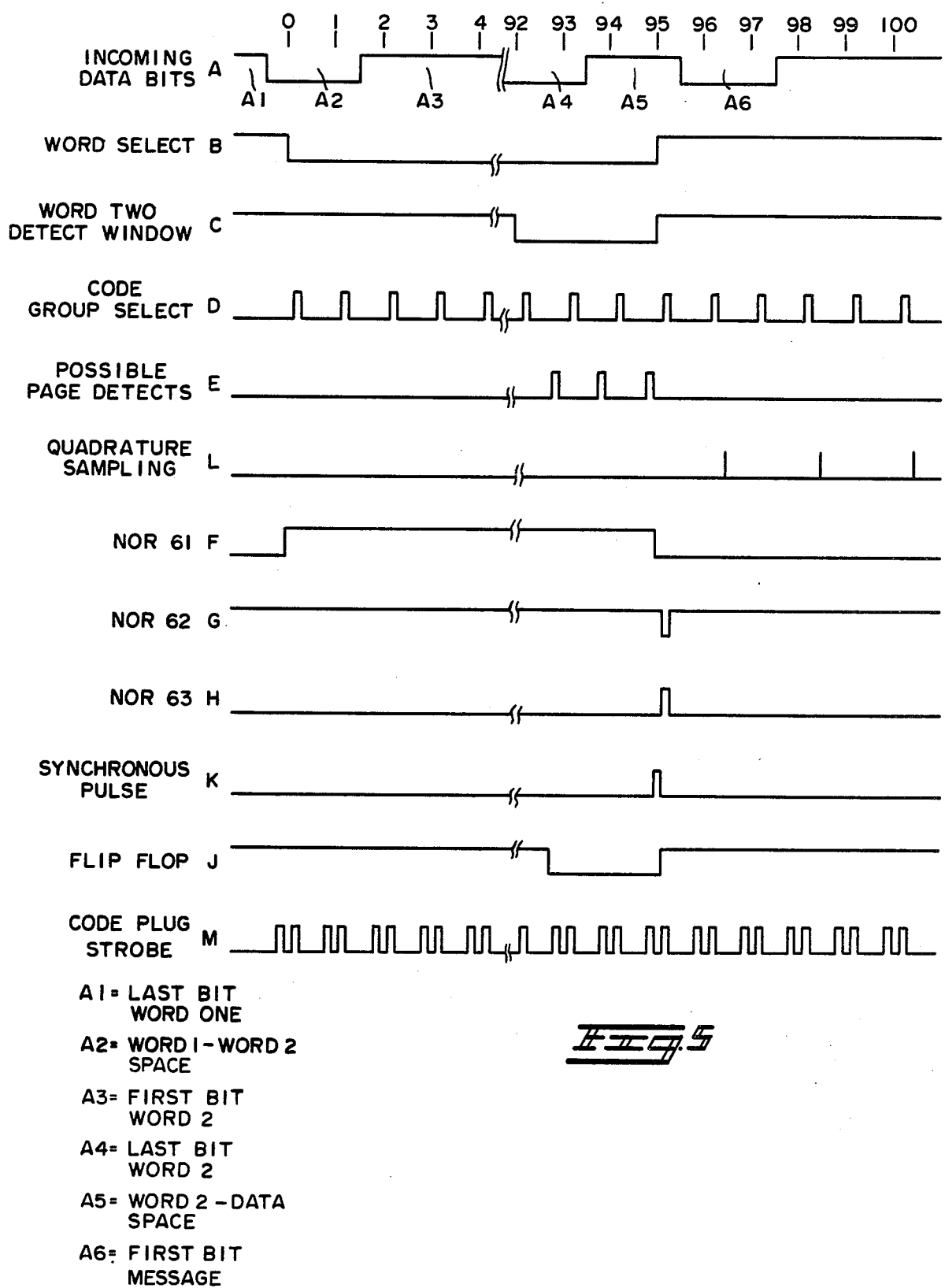

DATA SYNC ACQUISITION IN AN ASYNCHRONOUS BINARY ADDRESS DECODER

BACKGROUND OF THE INVENTION

This invention relates to the field of binary digital decoders and more particularly to the acquisition of data sampling synchronization and power-up timing using signals present in an asynchronous decoder.

Asychronous digital detectors requiring no bit or frame synchronization in order to detect a predetermined code address have been disclosed in U.S. Pat. Nos. 3,801,956 and 3,855,576, both being assigned to the same assignee as is the present invention. The first of the above-referenced patents discloses a system for asynchronously detecting one code word by cycling the sampled bits of the received data in parallel with the bits of the stored code address word, and counting correlations. The second referenced patent discloses a system using the asynchronous first word detect to provide synchronization for the second word detect. Thus, a relatively long preamble or framing data transmission is unnecessary and a large number of code addresses are made available.

Data terminals are now being used which must detect a binary digital address in a train of binary signals then, upon such detection, accurately decode the subsequent data message. With such terminals, it is possible to provide synchronization by transmitting a lengthy preamble during which a VCO is locked up and kept locked during the transmission by a phase locked loop. While operationally satisfactory, this requires much additional circuitry in the decoder. It is also possible to achieve synchronization with the decoder of the last referenced patent by using only second code words having a high number of level transmissions, thus reducing the detect time ambiguity caused by multiple detects of a word having a low number of transmissions. However, this reduces the number of possible code addresses and makes it necessary to individually select the second word of each assigned code address.

SUMMARY OF THE INVENTION

It is an object of this invention to provide message sampling synchronization for the decoder of a data terminal without transmitting information other than the address and message.

A further object of this invention is to provide message sampling synchronization and power-up timing using signals derived from the asynchronous code address detection circuitry.

A still further object of this invention is to provide highly accurate sync signals for the decoding of data messages with a minimum of added circuitry.

It is an additional object to provide message sampling synchronization in a system while allowing simplified selection of code addresses and a maximum number of addresses.

The above objectives and others are provided in a digital system designed in accordance with the invention. The asynchronous detection of the first word of the address provides synchronization for the detection of the second word. Detection of the first word-second word sequence provides an identification that a message is being sent to a particular data terminal. The second word detect signal and the timing signals required for that detection are utilized in a logic circuit which provides accurate synchronization for the message data sampling signals. Power-up timing must also be provided for the microprocessor which decodes and further processes the received data, since such units are typically maintained in a standby condition when not being used. Some constraint is required on the choice of the first word of the address but no constraint on the second word, thus allowing over 80,000 combinations of two 23 bit words.

BRIEF DESCRIPTION OF THE DRAWING

FIG. 5 is a timing chart relating to FIGS. 1 to 4.

DETAILED DESCRIPTION OF A PREFERRED EMBODIMENT

Figure 1:
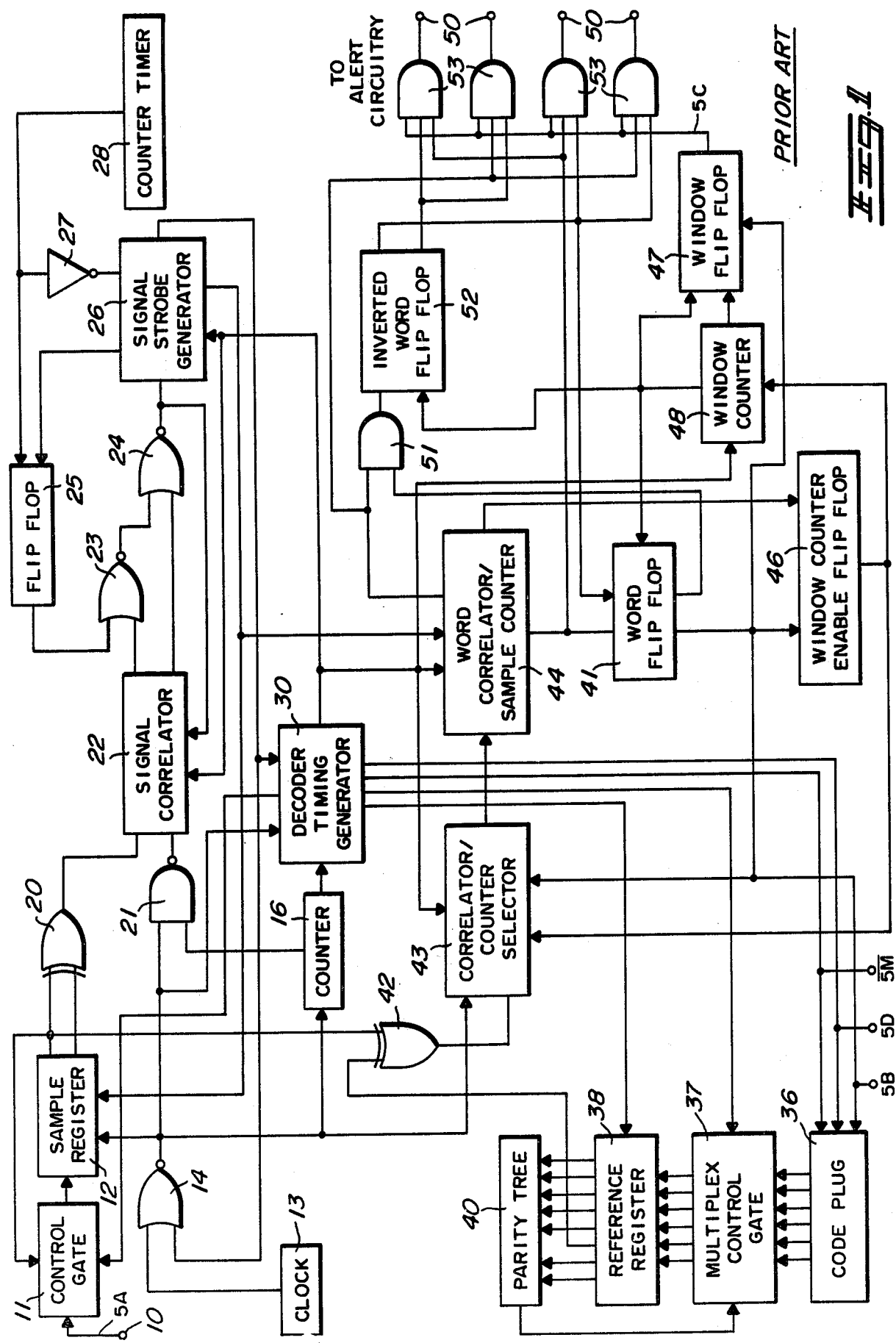
FIG. 1 is a block diagram of the asynchronous digital address detector with which the invention could be used.

The detector circuit of FIG. 1 is taken, essentially unchanged, from U.S. Pat. No. 3,855,576. The drawing is used in this form to facilitate reference to that patent, should that be desired.

Described in the above-mentioned patent is the detector circuit for detecting asynchronously, that is, with no preamble or framing required, individual address code as for a pager consisting of two 23 bit binary "words". Detection of word one is accomplished by cycling the received data bits and the bits of word one of the stored address code through a comparator and counting correlations. The detection of word one serves to "sync" the detection of word two. The combination of asynchronous word one detection and synchronous word two detection allows over 400,000 different two word addresses in a single system. When used in a data terminal, the two word address will be followed, at a set interval, by a binary coded message. In order to achieve data sampling synchronization with sufficient accuracy, the first word of the address must be constrained, i.e., only words with a high number of level transitions can be utilized. With a high level word, detection is only possible "on-time", and not possible early or late. This still allows over 80,000 different code addresses when using two 23 bit words. The circuit of the present invention is adapted to be used with the address detector of the above-referenced patents and is described herein in that environment. It is also shown coupled to the microprocessor of a data terminal. It should, of course, be obvious to anyone skilled in the art that the invention could be utilized in other applications and, as will be described hereinafter, the invention is only dependent on certain input signals.

In FIG. 1 only the general operation of most of the blocks will be described inasmuch as they have been fully disclosed in the above-referenced patents. Signal 5a (see FIG. 5) received at the input terminal 10 of the detector of FIG. 1 may have been broadcast, received, demodulated, amplifier and limited in any suitable fashion, but for use in this detector, it will consist of a train of binary digital signals or bits (termed "high" and "low" hereinafter). In this train of signals there may be an individual page address made up of two different 23 bit binary words spaced apart by one half bit, followed by a binary message made up of bits, each having one half the length of the address bits. The spacing between the address and the message will be discussed in relation to FIG. 4.

For easier understanding of the invention, a page alert will be described first. Signals from the terminal 10 are coupled through a control gate 11 to a sample register 12. A clock 13, running at four times the received bit rate, is coupled through a NOR gate 14 to the register 12 for sampling each received bit four times and shifting the received bits through the register. The clock 13 is also coupled to a counter or divider 16 wherein the clock frequency is divided by two and by four. The portion of FIG. 1 including the NOR gate 14, and exclusive (EX) OR 20, NAND gate 21, signal correlator 22, NOR gates 23 and 24, flip-flop 25, signal strobe generator 26, inverter 27, and counter timer 28 provide primarily a battery saver function and for the purposes of this description it is only necessary to have a signal from the signal strobe generator 26 enabling clock pulse from the clock 13 to be passed through the the NOR gate 14 for enabling the signal 5M (see FIG. 5). The signal 5M will be further discussed hereinafter.

A decoder timing generator 30 is coupled to an output of the counter 16 from which is received one pulse for every four master clock pulses. The generator 30 is also coupled to the output of the NOR gate 14 and to the output of the signal strobe generator 26. Control signals from the decoder timing generator 30 provide most of the function timing for the detector of FIG. 1. The address codes of the unit are stored in a code plug 36; in this instance, 12 bits for each of the two words. A multiplex control gate 37 controls the coupling of each group of six bits to a reference register 38. A parity tree 40 is coupled to the reference register 38 and to the multiplex control gate 37 for adding eleven parity bits after the stored twelve bits of each word. Also coupled to the code plug 36 is an output of a word flip-flop 41, the function of which will be described hereinafter. At this point in the description, it will suffice to say that one output 5B of the flip-flop 41 changes level when it is desired to look for a different word in the train of input signals. The level of the word select signal 5B applied to an input of the code plug 36 enables the stored data bits of a selected one of the stored words to be transferred to the register 38. One output signal 5D from the decoder timing generator 30 is termed "code group select signal" and has one pulse during each sampling period. The signal 5D determines whether the first or second group of six bits of the enabled word is to be coupled to the register 38. Another output signal 5M, termed "code plug strobe", triggers the entry of the chosen six bits into the register 38 and it consists of a pair of pulses during each sampling period. The signals 5B, 5D and 5M are coupled to the circuit of FIG. 2 for use in providing a data sync pulse and microprocessor power up. It is to be noted that the second pulse in each pair of pulses in signal 5M serves no purpose in the delay circuit. It may be seen from the timing chart of FIG. 5 that, lacking signal 5D, an equivalent signal could be derived from the second pulse of 5M.

Individual alerts are obtained asynchronously in the circuit of FIG. 1 by first comparing received binary signals with the stored bits of the individual address code. Each of the received bits is sampled four times and stored in the sample register 12, comprising 92 stages. Assuming that all 92 stages contain temporarily stored data bits, the bits will be inverted, then coupled to an EXOR 42 as will the 23 bits of the word in the reference register 38. Each bit from the register 38 will be compared with four bits from the sample register 12. The output of the EXOR 42 is coupled to a correlator/counter selector 43. The selecting function will be described hereinbelow, but at this point in the sequence, the selector couples the correlation counts to a word correlator/sample counter 44. All of the above described comparisons will take place during one sampling period. After each comparison, the sample bit in stage 92 of the sample register 12 is cycled back to the first stage. After four comparisons, the compared bit in the reference register 38 is also cycled. After 92 comparisons, the bit in the last stage of the sample register is lost, a new sample is inserted into the first stage, and a new set of comparisons is made, the pattern being repeated until word one is detected. At word one detect, the word select signal 5B from the word flip-flop 41 changes level, the code plug 36 develops word two in the storage register 38, the correlator/counter selector 43 stops coupling error signals to the counter in the word correlator sample counter 44 and instead couples a pulse from the decoder timing generator 30 during each sample bit period. The 5B signal also sets a window counter enable flip-flop 46 and a window flip-flop 47 for subsequent operation. At count 92, i.e., 92 samples after word one detect, the window counter 48 triggers window flip-flop 47, whose output is 5C, and if word two is detected on counts 93, 94 or 95, a page alert signal is provided to one of the terminals 50. A NAND gate 51, inverted word flip-flop 52 and four NAND gates 53 are included in the detector to provide detect for combinations of address words and their complements, i.e., AB, $\overline{AB}$, $\overline{A}B$ and $\overline{AB}$. In a data terminal application it may be unnecessary to provide address word complement detect, and only one terminal 50 might be provided, connected to the word correlator/sample counter 44. At the 95 count, the window flip-flop 47 is reset by the window counter 48, and the word flip-flop 41 and window counter enable flip-flop 46 will also be reset. If word two was not detected during the 92-95 count window, the detector will resume looking for word one.

To recapitulate briefly, word one has been detected and this detect has provided synchronization for detection of word two during a specified window. The detection of word two within this window may produce one, two or three detect signals as shown in 5E. The word select signal 5B has again changed level to put word one back into the reference register 38.

Figure 2:
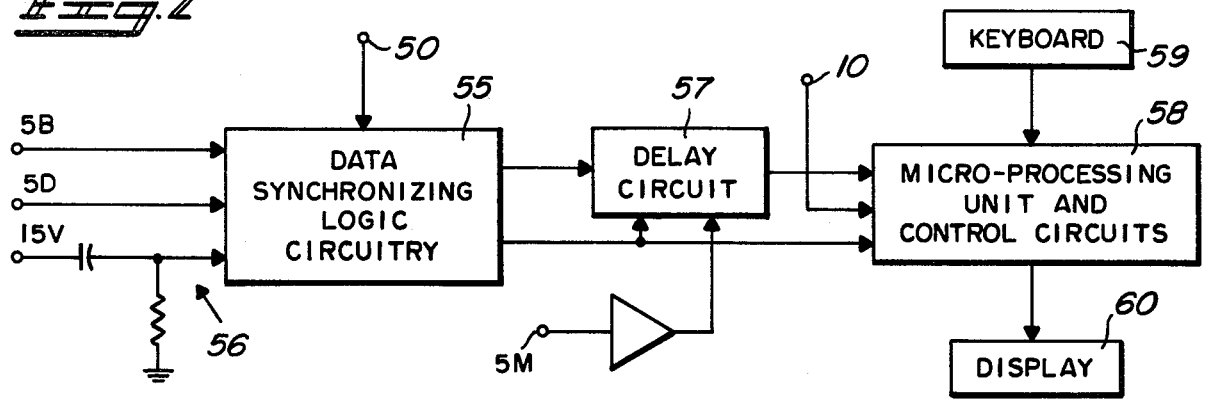
FIG. 2 is a block diagram showing the interconnections of the invention in a data control terminal using the detector of FIG. 1.

In FIG. 2 a block diagram indicates the data sync logic circuitry 55 having inputs from the detector of FIG. 1 indicated as 5B, 5D and 50. Another input comes from the power reset circuitry 56 and is shown as coupled through a capacitor to a 5 volt supply. Thus an initial pulse or high will be applied to the circuitry 55 when the power reset circuitry is activated, followed by a low thereafter. The logic circuitry 55 may be coupled through a delay circuit 57 to the microprocessor control circuits 58. Also coupled to the microprocessor circuits are a keyboard 59 for providing user input and a display 60 for providing readout capability. The code plug strobe signal from the detector of FIG. 1 is inverted and applied to the delay circuit 57.

Figure 3:
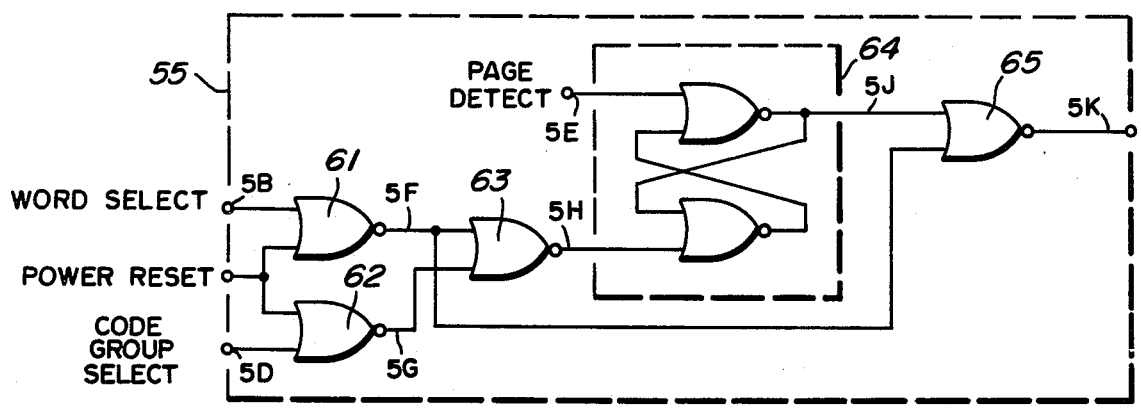
FIG. 3 is a logic diagram of the sync signal circuit of the invention.

In the logic diagram of FIG. 3 a synchronizing signal 5K is developed which, when applied to the microprocessor control circuits 58, will allow accurate sampling of the received data message. A NOR gate 61 receives the power reset signal on one input and the word select signal 5B on a second input. A NOR gate 62 receives the power reset signal on one input and the code group select signal 5D on the second input. The outputs 5F and 5G of the NOR gates 61 and 62, respectively, are applied to the inputs of a NOR gate 63 whose output is coupled to reset a flip-flop 64. The page detect signal 5E is applied to the set input of the flip-flop 64 and the Q output 5J of the flip-flop 64 is applied to one input of a NOR gate 65. A second input of the NOR gate 65 is the signal 5F from the NOR gate 61. In this embodiment of the synchronizing circuit, the page detect signal 5E will set the flip-flop 64, the word select signal will be inverted in the NOR gate 61 and the code group select signal 5D will be inverted in the NOR gate 62. However, in the waveform 5G of FIG. 5, only one pulse has been shown for clarity, this being the one pulse utilized to provide data sync. With inputs 5F and 5G to the NOR 63, its output 5H will be a series of pulses beginning after count 95. Again, a single pulse is shown in the drawing for clarity. This is the first pulse of the series and is the one which directly resets the flip-flop 64. It will be seen from FIGS. 3 and 5 that, after the page detect 5E has set the flip-flop 64, the transition of the word select signal at count 95 (95 counts after word one detect) will initiate the sync pulse 5K and the next subsequent pulse of the code group select signal 5D will cause the end of the pulse 5K. While any one of the page detects shown in signal 5E may set the flip-flop 64, the sync pulse 5K will always be developed at the 95 count. The pulse 5K, having only an acceptable degree of ambiguity, will be processed in the microprocessor control circuits 58 to provide sampling of the received data message as shown in the quadrature sampling signal 5L. If the microprocessor circuits do not use a "stand-by" mode, signal 5K syncs directly, otherwise the delayed signal is used.

Figure 4:
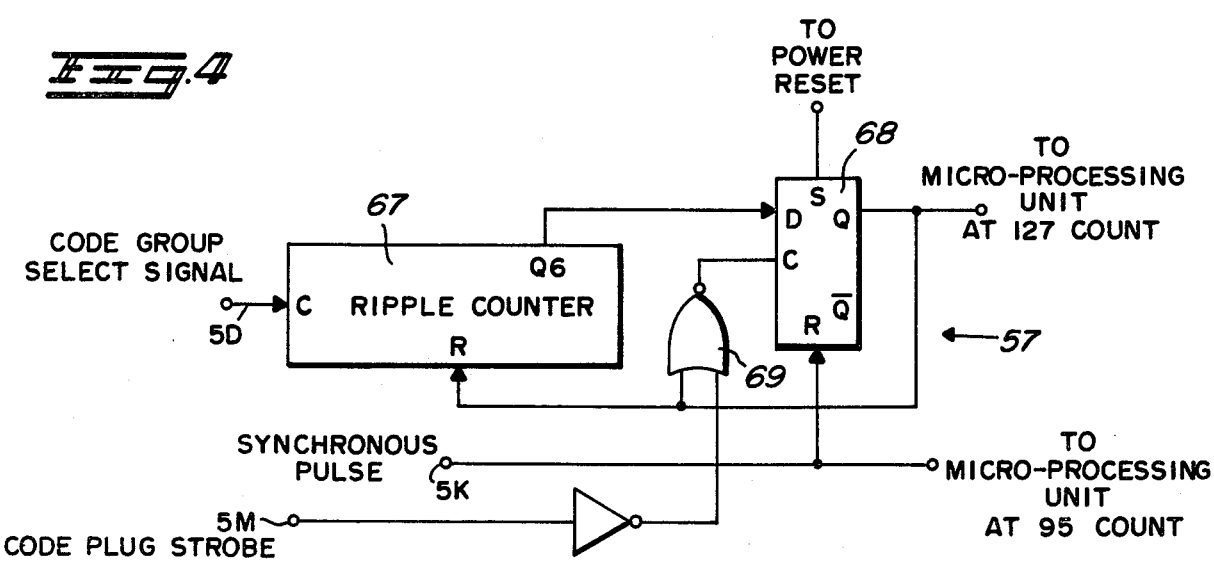
FIG. 4 is a logic diagram of the delay circuit of the invention.

In FIG. 4 is shown the delay circuit 57 which also utilizes signals from the detector plus the sync pulse 5K. Some form of delay is usually required in such an application since microprocessors require a certain amount of power and it is desirable to maintain them in standby position when not in active use. Thus, a normal data transmission would consist of a two word address to alert a particular data terminal, followed by a data message spaced a set period from the address. During the set period the microprocessor is alerted to the fact that a message will be incoming and its circuits are initialized and powered-up in time to process the first bit of the data message. The code group select signal 5D is used as the clock input signal for a ripple counter 67. The output of the ripple counter 67 provides the data input for a D-type latch 68. The clock input for the latch 68 comes from a NOR gate 69 having one input from the inverted code plug strobe signal 5M and a second input from the Q output of the latch 68. The latch 68 is set by the output of the power reset circuit and reset by the sync pulse 5K at count 95 after first word detect, the sync pulse also being provided to the microprocessor control circuit 58. The signal 5K thus may be used directly to initialize the microprocessor, alerting it to the fact that a message is being received. The delayed sync pulse will be used to synchronize a sample generator (not shown) and, in this embodiment, will arrive 32 counts after the sync signal, or 127 counts after the first word detect. Sampling pulses may be as shown in 5L.

Thus, there has been provided, in a data terminal having the capability of asynchronously detecting a digital, binary coded address, synchronization of the data sampling using detector signals. By using signals already present in the detector circuit, the synchronization and power up functions have been provided in the terminal with a minimum of additional circuitry. While shown in the environment of a particular data terminal with a specific detector circuit, it will be obvious that the invention is not so limited and that other applications are possible. It is contemplated to include all applications and embodiments of the invention as fall within the spirit and scope of the appended claims.

What is claimed is:

1. In an apparatus for detecting, sampling and decoding binary-coded address words and message bits contained within a received train of pulses, circuitry for providing a synchronizing pulse for the sampling of said message bits and comprising in combination:
    timing means for providing a first timing pulse during each address sampling period;
    first bistable circuit means for providing a signal enabling the detection of selected ones of the address words;
    detect circuit means for providing a page detect pulse in response to the detection of the binary address;
    first gating means coupled to the bistable means for being enabled by a level transition of the word select enabling signal, and to the timing means for providing an output signal in response to the next subsequent timing pulse from the timing means;
    second bistable means coupled to the detect circuit means for being set by the page detect pulse and coupled to the first gating means for being reset by the output signal of the gating means;
    second gating means coupled to the first bistable circuit means for initiating a sync pulse in response to a level transition of the work select enabling signal and to the second bistable means for ending said sync pulse in response to a level transition in the output signal of said second bistable means; and
    sampling means for receiving the message bits and coupled to the output of the second gating means for providing message bit sampling pulses synchronized by said sync pulse.

2. The apparatus of claim 1 wherein the synchronizing pulse circuitry further includes an initializing circuit and third and fourth gating means, the third gating means being coupled between the first bistable means and the first gating means, the fourth gating means being coupled between the timing means and the first gating means being coupled for being enabled by the initializing circuit.

3. The apparatus of claim 1 and further including delay means coupled to receive the synchronizing pulse and adapted to provide an interrupt signal to the decoder portion of the apparatus, said signal beginning a predetermined period subsequent to the synchronizing pulse.

4. The apparatus of claim 3 wherein the delay means includes a counter means coupled to the timing means for counting the output pulses of said timing means, and providing an output at the end of said predetermined period.

5. The apparatus of claim 4 wherein the delay means further includes a latching means coupled for being reset by said sync pulse and for being enabled by said delayed sync pulse and for being actuated by the next subsequent timing pulse after enablement.

6. The apparatus according to claim 1 wherein the timing means provides an additional pulse preceding each of said first timing pulses and wherein the delay means further includes a latching means coupled for being reset by said sync pulse and for being enabled by said delayed sync pulse and for being actuated by the next subsequent additional timing pulse after enablement.

7. In an apparatus for detecting, sampling and decoding binary-coded address words and message bits contained within a received train of pulses, circuitry for providing a synchronizing pulse for the sampling of said message bits and comprising in combination:

a first signal source for providing a first timing pulse during each address sampling period;

a second signal source for providing a signal enabling the detection of selected ones of the address words;

a third signal source for providing a page detect pulse in response to the detection of the binary addres;

first gating means coupled to the first and second signal sources for being enabled by a level transition of the word select enabling signal and for providing an output signal in response to the next subsequent pulse from the first signal source;

bistable means coupled to the third signal source for being set by the page detect pulse and coupled to the first gating means for being reset by the output signal of the gating means;

second gating means coupled to the second signal source for initiating a sync pulse in response to a level transition of the word select enabling signal and to the bistable means for ending said sync pulse in response to a level transition in the output signal of said bistable means; and sampling means for receiving the message bits and coupled to the output of the second gating means for providing message bit sampling pulses synchronized by said sync pulse.

* * * * *